United States Patent [19]
Gregory et al.

[11] Patent Number: 4,494,720
[45] Date of Patent: Jan. 22, 1985

[54] TILT SWIVEL BASE

[75] Inventors: Jack Gregory; Christian C. Landry, both of Acton, Mass.

[73] Assignee: Digital Equipment Corporation, Maynard, Mass.

[21] Appl. No.: 330,716

[22] Filed: Dec. 14, 1981

[51] Int. Cl.³ ............................................. A47G 29/00
[52] U.S. Cl. ..................................... 248/371; 248/346
[58] Field of Search ............... 248/371, 178, 183, 346, 248/181, 663; 339/7; 340/700; 179/2 TV

[56] References Cited

U.S. PATENT DOCUMENTS

| | | | |
|---|---|---|---|
| 1,743,210 | 1/1930 | Haffner | 248/371 |
| 1,970,630 | 8/1934 | Searing | 248/371 |
| 2,796,226 | 6/1957 | Dalton | 248/183 |
| 3,389,366 | 6/1968 | Galles | 339/7 |
| 3,462,112 | 8/1969 | Broek | 248/349 |
| 3,603,545 | 9/1971 | Boniface | 248/371 |
| 3,970,792 | 7/1976 | Benlam | 248/183 |
| 4,313,112 | 1/1982 | Foster | 340/700 |
| 4,349,173 | 9/1982 | Volka | 248/183 |
| 4,365,779 | 12/1982 | Bates | 248/371 |
| 4,368,867 | 1/1983 | Pendleton | 248/346 |

Primary Examiner—Reinaldo P. Machado
Assistant Examiner—Alvin Chin-Shue
Attorney, Agent, or Firm—Cesari and McKenna

[57] ABSTRACT

A tilt swivel base for a video terminal includes a lower section which is supported by way of a swivel so that the lower section can be swiveled relative to a supporting surface. An upper section is supported on the lower section, the two sections mating at surfaces which are curved from the front to the back of the base about an imaginery axis which is located appreciably above the base. The upper section is movable relative to the lower section forwardly and rearwardly so as to adjust the tilt angle of the upper section and of a terminal supported thereby relative to the supporting surface. Structures for controlling the relative motion of the upper and lower sections as well as establishing their relative positions are also disclosed.

23 Claims, 10 Drawing Figures

TILT SWIVEL BASE

This invention relates to a base for a video terminal. It relates more particularly to a base such as this which facilitates adjustment of the position of the terminal for optimum viewing.

BACKGROUND OF THE INVENTION

A video terminal is a piece of electronic equipment including a video screen which permits an operator to display information retrieved from a computer. The terminal may also include an electronic keyboard containing buttons similar to typewriter keys by which the operator can issue instructions to the computer to control the information being displayed on the screen. The video screen and the keyboard may be combined in a single housing or may be separate units which are connected by cables to each other and to the associated computer. Terminals such as this are used, for example, in word processing applications.

The video terminal including the keyboard are usually supported on a suitable desk, table or base with the operator being seated next to that support in a position to view the video screen and appropriately manipulate the keys on the keyboard. Obviously, the particular orientation of the video terminal depends upon the available space on the supporting surface and on the physical stature of the operator and the operator's personal preference. One operator might prefer that the terminal's viewing screen face head on; another operator might rather have the screen turned about a vertical axis at some angle. Likewise, a relatively short operator who has to look up to the terminal's display screen might prefer that the terminal be tilted so that that screen faces downward at some angle, while a taller operator might like the screen substantially vertical or even angled upwardly to some extent so that he faces it head on. Since several different operators might use the same video terminal, it would be highly desirable if that terminal could be both swiveled in a horizontal plane and tilted in a vertical plane so that its position can be adjusted to suit the needs of each particular user.

Various types of supports and bases do exist which incorporate a swivel to permit the article being supported to be turned about a vertical axis, e.g., a lazy Susan. Also, we are aware of certain supports which include provision for both swiveling and tilting the article being supported. Perhaps the most prevalent such support is a simple U-shaped bracket having its bridging portion pivoted to a base and the free ends of its arms pivoted to the opposite sides of the article to be supported, e.g., a nautical compass. This permits the article to be both tilted and swiveled relative to the base. However, this type of support is rather unsightly since the bracket arms must extend up some distance from the base to adequately embrace the article being supported. Also, means such as threaded nuts must be provided and manipulated for releasably retaining the article in its selected position of adjustment. Invariably also, the prior supports or bases which offer both swivel and tilt capabilities elevate the article being supported a considerable distance above the desk or other supporting surface. Bearing in mind that video terminals are frequently used in an office environment, that factor has undesirable consequences from an industrial design standpoint. Accordingly, because of the aforesaid design and practical considerations, most of the video terminals in present day use cannot be adjusted in tilt about a horizontal axis nor can they be swiveled about a vertical axis except by turning the entire terminal on the desk or other supporting surface.

SUMMARY OF THE INVENTION

Accordingly, the present invention aims to provide an improved base for a video terminal or similar article.

Another object of the invention is to provide a video terminal base which permits the terminal to be tilted about a horizontal axis and swiveled about a vertical axis so that the orientation of the terminal can be optimized for each particular user.

A further object of the invention is to provide a base such as this which can be located entirely underneath the terminal, yet which does not raise the terminal appreciably above the desk or other supporting surface.

Still another object of the invention is to provide a video terminal base which permits the user to adjust the orientation of the video terminal in a minimum amount of time and without manipulating any fixtures or fasteners.

Yet another object of the invention is to provide a tilt swivel base which is relatively easy and inexpensive to manufacture and assemble.

Another object of the invention is to provide a tilt swivel base which is quite unobtrusive and can even appear to be actually part of the object which it supports.

Another object of the invention is to provide a tilt swivel base for a video terminal which does not interfere at all with the proper operation of and connections to the terminal which it supports.

Another object of the invention is to provide a tilt swivel base for a video terminal which provides a very stable support for that terminal whatever its orientation.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Our tilt swivel base comprises a generally rectangular hollow lower section and a similarly shaped hollow upper section both dimensioned to fit entirely underneath the terminal. Mounted to the underside of the lower section is a flat lazy Susan-type pedestal which permits the lower section to swivel about a vertical axis relative to the desk or other surface on which the base is placed. The lower section has an upper wall which is curved from front to back. In other words, that wall is shaped more or less like a section of a cylinder with the cylindrical axis extending laterally along that section.

The upper section of the base is supported on the lower section. Its lower wall is also curved so that it nests on and mates with the correspondingly curved wall of the lower section. A pair of curved tracks are formed adjacent the side edges of the curved wall of one of the sections, e.g. the lower section. The curved wall of the other section, on the other hand, is fitted with sets of wheels which are positioned to ride on those tracks when the two sections are nested together. Those wheels can be snapped into place in the upper housing section without requiring any tools or equipment as will be described in more detail later. Accordingly, the upper section is free to slide or roll forwardly and rearwardly on the lower section. Since the mating walls of the two sections are curved, the rolling action of the upper section changes the angle of tilt of that section about a horizontal axis corresponding to the cylindrical axis of the two section walls.

Means are provided for releasably fastening the two housing sections together to permit their aforesaid relative sliding motion between fixed limits. Accordingly, when a video terminal is positioned on the upper section, the terminal or, more particularly, its viewing screen can be tilted downwardly or upwardly to the desired angle simply by rolling the upper section forwardly or rearwardly to an appropriate location on the lower section. Means are also provided on the curved walls of the those sections which resiliently interfit to releasably retain the two sections at any selected tilt position. These means also provide the required holdback force for a given tilt position to ensure that the weight of the terminal acting at its center of gravity does not "drive" the tilt motion of the base.

Accordingly, once the operator has seated himself in front of the terminal, he can turn the terminal to any angle about a vertical axis, the swivel base on the lower base section permitting this. Also, he can tilt the terminal about a horizontal axis to the angle that is best suited for his viewing. Once the terminal has been positioned as aforesaid, it will remain in that position until a conscious effort is made to alter that position.

As will be described in more detail later, our tilt swivel base has been designed so that it stably supports the video terminal at any tilt angle within the allowed range. In other words, the areas and radii of curvature of the two curved base section walls are arranged so that the center of gravity of the terminal supported on the base remains near the vertical axis of the base no matter which way the terminal is tilted. Furthermore, this is accomplished while maintaining a very small profile for the base. Indeed, a base made in accordance with this invention may be only three inches high. Accordingly, it does not detract at all from the appearance of the terminal which it supports and, in fact, it may appear to be actually a part of that terminal.

The base is composed primarily of molded plastic parts which can be manufactured in quantity quite inexpensively. Furthermore, the components of the base can be assembled quite easily by the average production worker. Further, as will be seen presently, the base is designed so that it does not interfere at all with the proper operation of the terminal which it supports. That is, it does not obstruct the flow of cooling air through the terminal or inhibit the making of electrical connections to the terminal at any of its positions of adjustment. Accordingly, the tilt swivel base should find wide application in offices and elsewhere where video terminals are employed.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
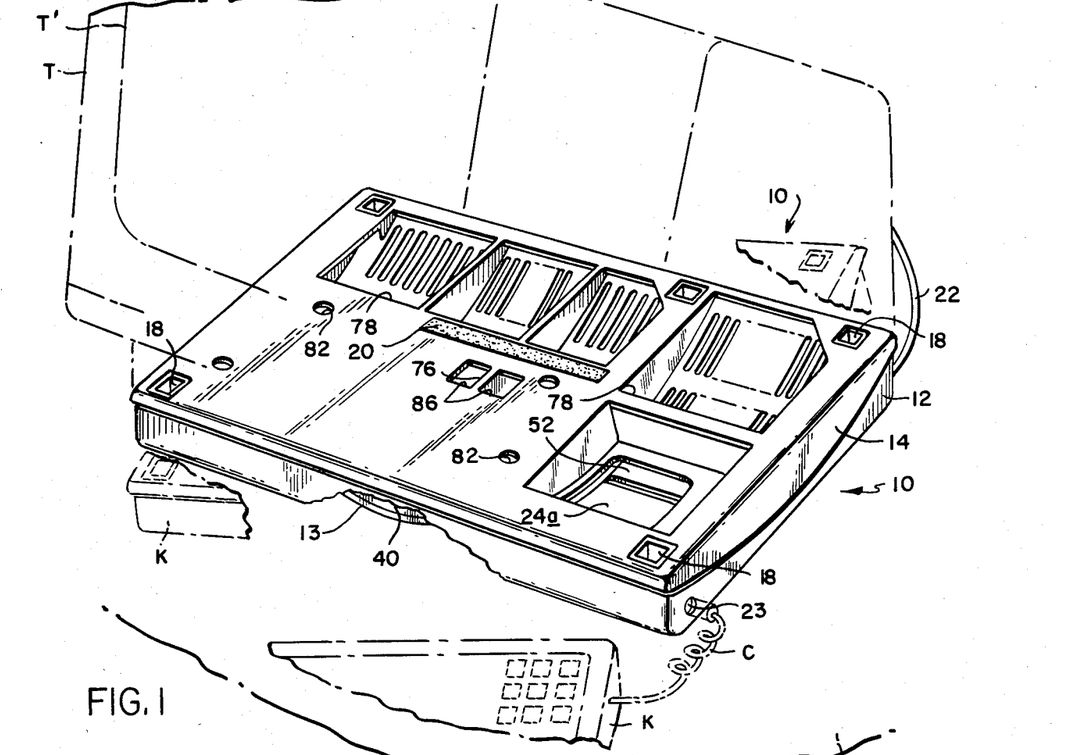
FIG. 1 is a perspective view with parts broken away of a tilt swivel base embodying our invention showing the base supporting a video terminal in a neutral or reference position.
Figure 2:
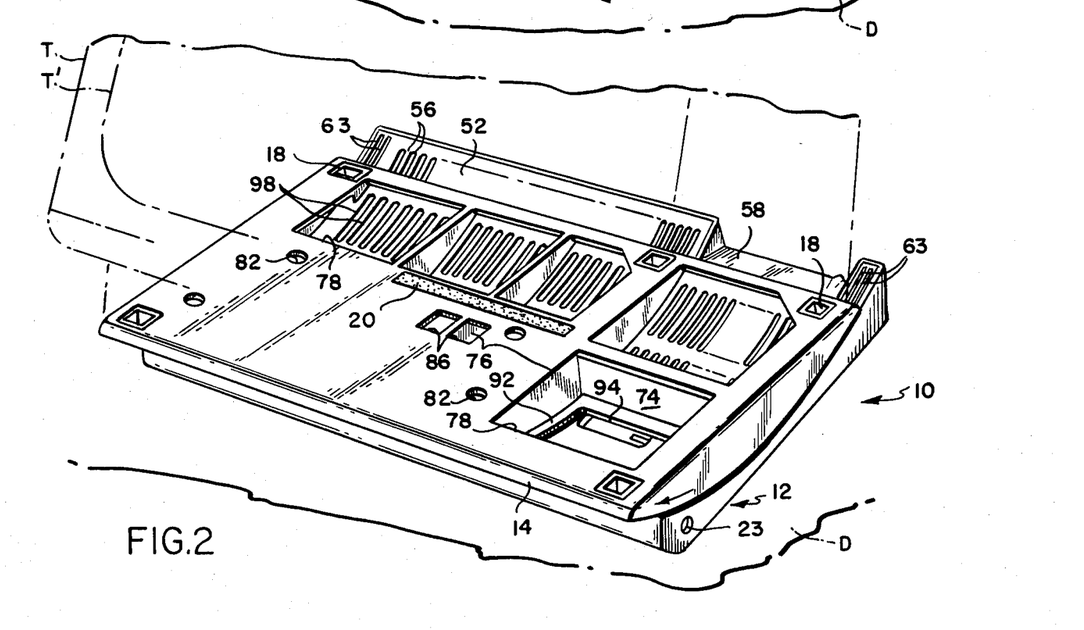
FIG. 2 is a similar view showing the base supporting the terminal in a position that is tilted upwardly from the position in FIG. 1.

Referring to FIGS. 1 and 2 of the drawings, our tilt swivel base indicated generally at 10 is shown supporting a video terminal shown in dotted lines at T on a desk D. The illustrated base 10 is especially suited to support a terminal of the type manufactured by Digital Equipment Corporation of Maynard, Mass. under its designation VT100. That particular terminal has a separate keyboard shown in dotted lines at K.

Base 10 comprises a lower section 12 including a swivel pedestal 13 which rests on a desk or other suitable surface and an upper section 14 on which the terminal T is placed. The terminal specifically identified above has five small depending rubber pedestals or feet. Accordingly, the upper wall of section 14 is provided with five appropriately located vertical receptacles 18 which receive those feet and thus locate the terminal on the base. Preferably a strip 20 of one component of a Velcro hook and eye fastener is adhered to the top of section 14. This strip is positioned to mate with its counterpart attached to the underside of terminal T to removably secure the terminal to the base 10.

Keyboard K is normally positioned in front of the terminal where it is accessible to the operator. The keyboard is connected electrically to the terminal by way of a cable 22 which is routed through the base. One end of that cable extending from the rear of base 10 is terminated by a plug 22a (FIG. 5) which plugs into the rear of the terminal. The other end of the cable is terminated by a socket 22b (FIG. 5) accessible through an opening 23 at the front of the base. As shown in dotted lines in FIG. 1, a cable C from the keyboard plugs into the socket 22b. Accordingly, there are no wires from the keyboard to the terminal draped across the desk.

The construction of the present base 10 permits the base section 12 to be swiveled on its pedestal 13 about a vertical axis to substantially any angle, two such angles being indicated in FIG. 1. Of course, the keyboard is positioned in front of the terminal as required to permit the base and the terminal which it supports to be turned.

Figure 3:
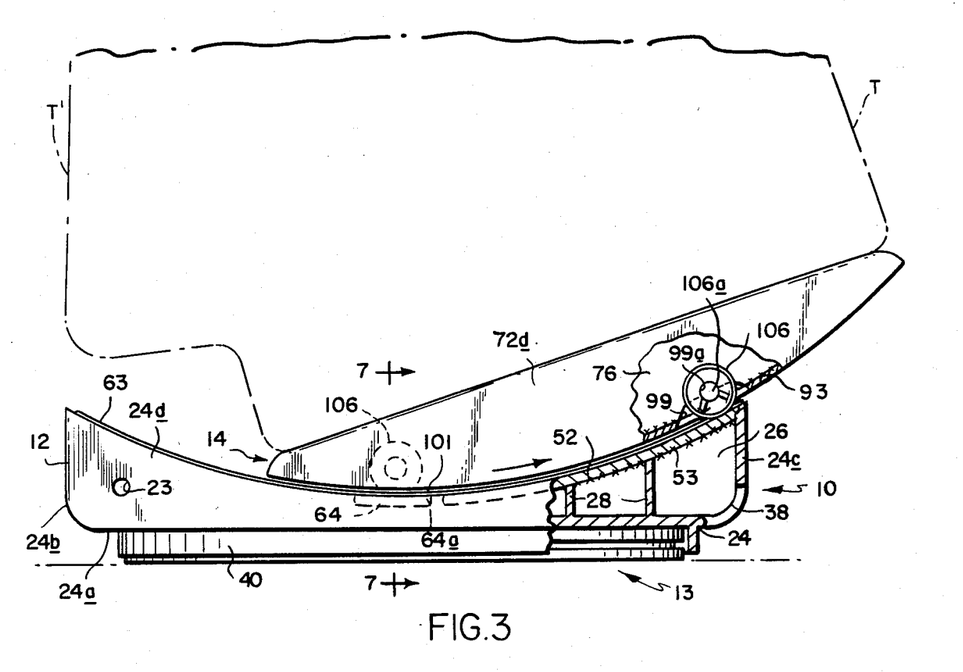
FIG. 3 is a side elevational view with parts broken away illustrating the base supporting a terminal in a position which is tilted downwardly from the position in FIG. 1.

In addition, the base 10 permits the terminal T to be tilted about a horizontal axis so that its video screen T' can be angled upwardly or downwardly to suit the user's preference. FIG. 1 shows the base supporting the terminal in a neutral position so that the terminal screen T' is oriented as it would be if the terminal were simply resting on the desk D. In the terminal specifically identified above, the viewing screen has a built-in upward tilt of 7.5°. FIG. 2 illustrates the base 10 with its upper section 14 in a forward position which tilts the terminal so that its viewing screen T' is tilted upwards even more than in FIG. 1. FIG. 3 illustrates the base with the upper section 14 in a rearward position so that it imparts a downward tilt to the terminal viewing screen T'.

The base specifically illustrated herein is designed so that section 14 can move forwardly as shown in FIG. 2 to a distance that will tilt the terminal screen T' upwardly to an angle of about 7.5° from its reference position illustrated in FIG. 1. The rearward excursion of section 14, as shown in FIG. 3 is even greater in that it can achieve a downward tilt of the terminal screen of up to 15° from the FIG. 1 reference position. In other words, the base 10 permits the tilt angle of the terminal T to be varied over 22.5° and the screen T' to be tilted up to 7.5° on each side of a vertical plane. Thus, the specific orientation of the terminal and, more particularly, of its viewing screen can be adjusted to almost any swivel angle and/or tilt angle that will best suit the requirements of the particular operator. Moreover, these adjustments can be effected without the operator having to manipulate any fasteners to set and maintain a particular position of adjustment.

Even though the base has the aforesaid tilt and swivel capabilities, it still has a very low profile. The illustrated base 10 designed especially to support the VT100 terminal has a width of about 18 inches, a depth of about 12 inches and a height of only about 3 inches.

Figure 4:
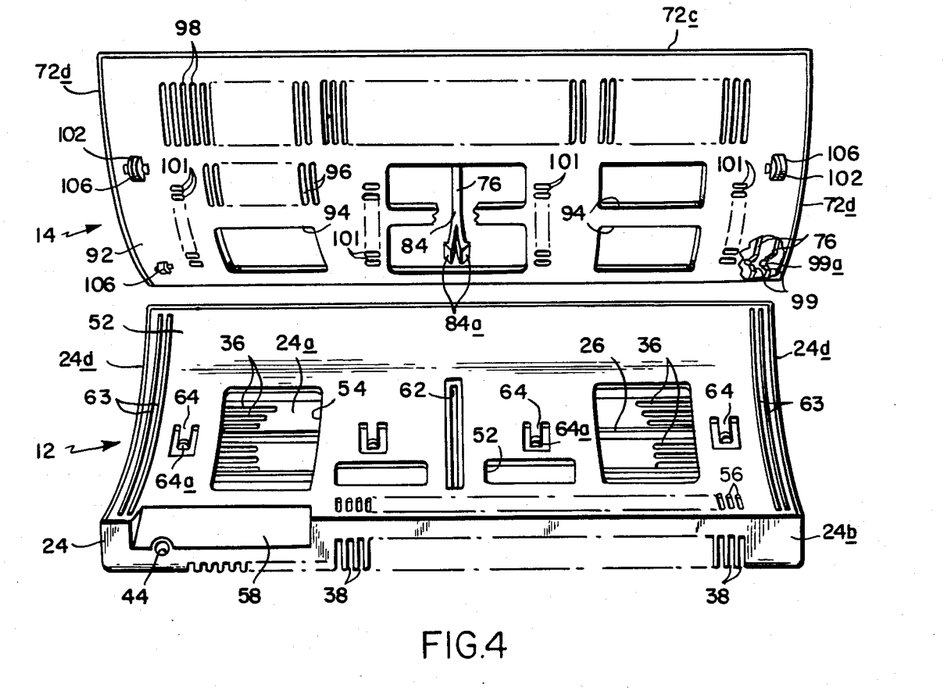
FIG. 4 is an exploded perspective view from the rear of the FIG. 1 base.
Figures 5, 10:
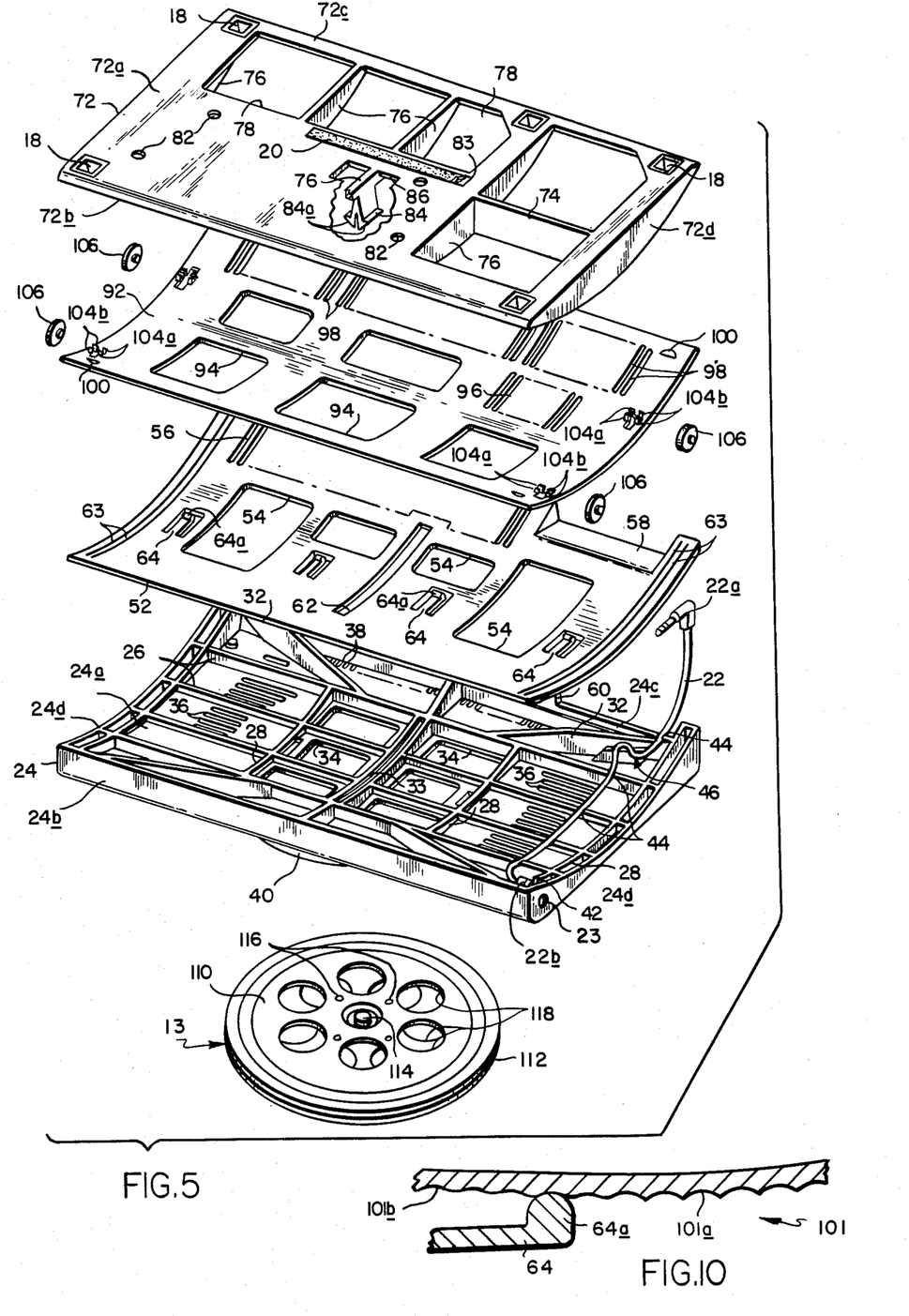
FIG. 5 is an exploded perspective view showing the components of the base in greater detail.
FIG. 10 is a fragmentary sectional view on a larger scale showing a portion of the base in greater detail.

Referring particularly to FIGS. 3 to 5, the base bottom section 12 comprises a generally rectangular shell 24 having a bottom wall 24a, a front wall 24b, a rear wall 24c and a pair of side or end walls 24d. Formed integrally with these walls are a plurality of lateral upstanding ribs 26 which extend between side walls 24d. Intersecting ribs 26 are a series of upstanding front-to-rear-extending ribs 28. Additional diagonal ribbing 32 is provided between ribs 26 and the front and rear walls 24b and 24c. All of this ribbing helps to strengthen shell 24 and prevent it from deflecting. The upper edges of ribs 26, 28 and 32 are all profiled so as to define a concave surface having a cylindrical curvature more or less.

For reasons that will be described later, a long vertical slot 33 is provided in the central rib 28. The slot is centered on the transverse centerline of section 12. A plurality of rectangular openings 34 are provided in the shell bottom wall 24a on each side of slot 33. Also, arrays of slits 36 are formed in that wall outboard of openings 34 and a long series of slits 38 extending through the shell bottom and rear walls 24a and 24c is present at the rear of section 12. All of these openings and slits permit circulation of air through shell 24. Depending from bottom wall 24a is a circular flange or skirt 40 which surrounds pedestal 13.

The electrical socket 22b is positioned in a notch 42 formed adjacent the forward end of the rightmost rib 28. The socket is located with its aperture directly opposite the access opening 23 in the side wall of housing section 12. Additional notches 44 are provided in the shell ribs 26 and 32 and in the shell rear wall 24c so that the cable can be led out through the rear of the shell. Prior to exiting shell 24 through the rear wall thereof, the cable 22 is looped back and forth through a notch maze indicated generally at 46 in section 12 which prevents the cable from being pulled out of the shell.

As best seen in FIGS. 3 and 5, the base section 12 also comprises a generally rectangular cover 52 which is arranged to seat on the shell ribs 26, 28 and 32. For this reason, the cover is also curved more or less cylindrically in conformance to the surface defined by those rib edges. Cover 52 is permanently secured to shell 24 preferably by welding it to the curved edges of ribs 28, one such weld being shown at 53 in FIG. 3. The shell 24 wall edges extend up above the ribs a distance equivalent to the thickness of cover 52 so that, when the cover is secured to the shell, the wall edges are flush with the upper surface of the cover, thereby forming a closed box-like structure which is quite strong and rigid.

Cover 52 also has a plurality of relatively large rectangular openings 54 for ventilation purposes For a like reason, a lengthwise series of slits 56 is formed adjacent the rear edge of cover 52 which slits are disposed directly above the slits 38 in shell 24. The right rear edge segment of cover 52 is also formed with a flattened segment 58 which seats in a recess 60 (FIG. 5) in the shell rear wall 24c to provide a clearance space for any cable terminations that might be connected to the rear of terminal T.

Figures 7, 8, 9:
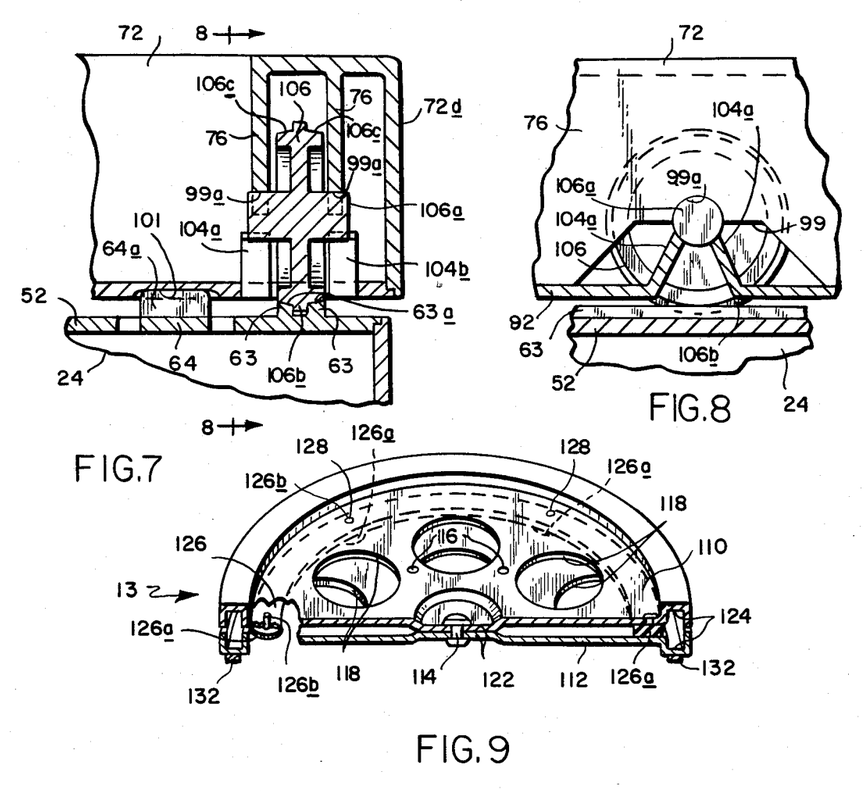
FIG. 7 is a sectional view along line 7—7 of FIG. 6.
FIG. 8 is a sectional view along line 8—8 of FIG. 7.
FIG. 9 is a perspective view in section illustrating the pedestal of the FIG. 1 base in greater detail.

Formed at the center of cover 52 is a slot 62 which registers with the slot 33 in shell 24. Also, a pair of closely spaced parallel raised tracks or rails 63 are present adjacent each side edge of cover 52. The upper surfaces 63a of the tracks in each pair are sloped toward one another as best seen in FIG. 7. Finally, a lateral series of rearwardly extending vertically deflectible resilient fingers 64 are formed in cover 52 near the transverse center line thereof. Each finger terminates in an upwardly projecting knob 64a which extends above the upper surface of cover 52 at the transverse centerline thereof.

Referring now to FIGS. 4 and 5, the base upper section 14 comprises a generally rectangular shell 72 having an upper wall 72a whose front and rear edges 72b and 72c are beveled. A pair of side walls 72c depend from wall 72d, terminating in lower edges having more or less the same curvature as that of cover 52 on section 12.

Shell 72 is rigidified by a laterally-extending depending rib 74, as well as by intersecting depending front-to-rear-extending ribs 76. The bottom edges of ribs 76 are also curved to conform to the cylindrical curvature of plate 52. Appropriate large rectangular openings 78 are formed in the shell wall 72a to assure adequate air flow through the shell and the shell wall 72a also includes various other small apertures 82 which are situated to receive bolts and other fittings which may project down from the underside of the terminal T. Of course, the placement of these apertures depends upon the particular terminal model. The Velcro strip 20 referred to at the outset is adhered in a shallow rectangular trough 83 (FIG. 5).

The terminal feet-receiving receptacles 18 mentioned above are formed in the shell wall 72a. In the base specifically illustrated, each receptacle 18 is generally rectangular with inwardly tapering depending walls so that each achieves a wedging fit with the terminal foot engaged in that receptacle. Consequently, the terminal bottom wall does not simply rest on the base 10. Rather, the terminal is supported by its feet in the usual way so that the support forces are concentrated at the correct locations on the terminal. The receptacles could, of course, be designed to provide clearance between their walls and the terminal feet.

Formed integrally with the central rib 76 is a depending bifurcated clip 84, the lower ends which terminate in laterally-extending barbs 84a. The square openings 86 in the shell wall 72a afford access for the mold parts which form the clip. As best seen in FIG. 4, there also exist adjacent each side wall of shell 72 a pair of closely spaced ribs 76 which are notched at 99.

Still referring to FIGS. 4 and 5, the base upper section 14 further includes a generally rectangular cover 92 which has the same curvature as that of cover 52 in section 12. Cover 92 is arranged to be positioned under the shell ribs 74 and 76 and to be secured to the edges of ribs 76 by welds 93 (FIG. 3). When the cover is properly anchored to the shell, the lower edges of the shell end walls 72d are flush with the underside of cover 92 with the shell and cover together form a very rigid box-like structure.

Like cover 52, cover 92 is formed with various large openings or apertures 94 to assure adequate ventilation through section 14. Arrays of slits 96 are provided for the same reason. In any event, a long array of slits 98 extends substantially the entire length of cover 92 adjacent the rear edge thereof between openings 78 in shell 72 and slits 38 and 56 in section 12 to assure proper air flow through the base at that location. Further, the upper surface of cover 92 is formed with flats 100 at the corners of the cover. When the cover is secured to the shell 72, these flats lie directly under the shell receptacles 18 and thus provide clearance for the bottoms of the terminal feet positioned in those openings.

Still further, a lateral series of front to rear-extending corrugated stripes 101 are present at the underside of cover 92. These stripes are centered along a line spaced somewhat forwardly of the transverse centerline of section 14. In the assembled base, these strips are located directly opposite the fingers 64 in base section 12 and they function as detents to establish the selected positions of base section 12 relative to section 14 as will be described in more detail later.

Figure 6:
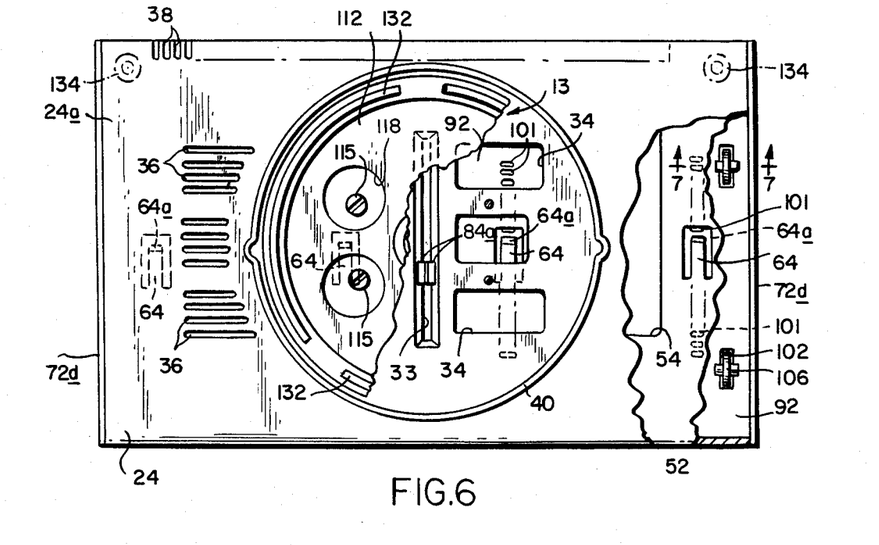
FIG. 6 is a bottom plan view with parts broken away of the FIG. 1 base.

As best seen in FIGS. 4 to 6, the cover 92 has four small rectangular X- or cross-shaped openings 102 near its corners, which openings are located directly opposite the wheel notches 99 when the cover is secured to shell 72. In the assembled base, these notches are also positioned directly above tracks 63 in section 12. Four pairs of upstanding resilient tabs or fingers 104a and 104b are provided at opposite sides of each opening 102. The tabs in each pair 104a and 104b are angled toward one another to some degree for reasons that will become apparent. These openings and tabs are arranged to permit assembly of four wheels 106 into the base section 14 after the cover 92 has been permanently secured to shell 72.

More particularly and referring especially to FIGS. 4, 7 and 8, each wheel 106 has a pair of axles 106a whose common axis is oriented perpendicular to the side edges of base section 14. When a wheel is inserted into its opening 102, the wheel axles 106a at opposite sides of the wheel engage the tabs 104a and 104b present at opposite sides of the opening 102. As clearly seen in FIG. 8, the spacing between the free ends of each pair of tabs 104a and 104b is less than the diameter of the wheel axles 106a. Also, the ends of each pair of tabs are located directly opposite semicircular bearing surfaces 99a at the center of each pair of notches 99 formed in shell 72. Those bearing surfaces 99a form a journal for axles 106a. Accordingly, when each wheel 106 is pushed into its opening 102, the wheel axles 106a spread each pair of tabs 104a and 104b apart sufficiently to permit axles 106a to seat on bearing surfaces 99a. The spaces between the tab ends and the corresponding bearing surfaces 99a are such that as soon as the axles seat on the bearing surfaces, they clear the tab ends permitting the tabs to snap back to unstressed positions underneath the wheel axles so that they rotatively retain the wheel in place. The diameter of each wheel is such that, when it is properly seated in section 14, a wheel sector projects out through the corresponding opening 102 so that it can engage base section 12.

Tilt swivel base sections 12 and 14 are assembled by positioning the latter section in register directly over the former section. This places the clip 84 directly opposite the slots 62 and 33 in section 12. It also aligns the wheels 106 at each side of section 14 with the tracks 63 formed at each side of section 12. When a downward force is applied to section 14, the clip 84 is forced through slots 62 and 33 squeezing the clip arms together. When their barbs 84a clear the underside of shell 24, the arms spring apart so that the barbs 84a engage under the shell bottom wall 24a thereby locking the two sections together as shown in FIG. 6. When the two sections 12 and 14 are assembled thusly, the wheels 106 are positioned on the tracks 63. Each wheel has a peripheral flange 106b which projects into the narrow gap between the corresponding pairs of tracks 63 so that section 14 is only free to move forwardly and rearwardly relative to section 12. Furthermore, these peripheries of the wheel on either side of flange are tapered or sloped at (FIG. 7) so as to mate with the sloped surfaces of the tracks. Thus each wheel tends to find its own line of travel along its track pair. Both of these factors combine to achieve a high resistance to racking so that the cylindrical surfaces of sections 12 and 14 remain in parallelism as section 14 rolls on section 12. The extent of that motion is, of course, limited by the engagement of clip 84 with the opposite ends of slot 33. As noted previously, the base specifically illustrated herein provides twice as much tilt in the downward direction as in the upward direction because the terminal screen T' is already tilted up by 7.5°. Therefore, clip 84 is positioned or offset forwardly of the transverse centerline of section 14 so that it engages the forward end of slot 33 when section 14 has tilted upwardly 7.5°. On the other hand, that forward offset of the clip permits section 14 to tilt downwardly 15° before the clip engages the rear end of slot 33.

When the two sections are assembled as aforesaid, the resilient fingers 64 in section 12 are located directly opposite the corrugation stripes 101 formed in the underside of section 14. Moreover, the fingers 64 are deflected downwardly to some extent so that the finger knobs 64a resiliently engage those stripes. Accordingly, when section 14 is moved forwardly or rearwardly with respect to section 12, that resilient engagement tends to inhibit the free movement of section 14. Resultantly, once the operator positions section 14 at a desired tilt angle, the section will remain at that position until the next adjustment is made. Thus, the operator obtains a measure of position feedback from the video terminal base so that he can adjust it easily to a tilt angle which exactly suits him.

Referring now to FIGS. 5, 6 and 9, the swivel pedestal 13 comprises a pair of upper and lower discoid metal plates 110 and 112 which are pivotally connected together at their centers by a heavy rivet 114. The plates are sized so that they fit snugly within the depending circular skirt or flange 40 formed at the underside of base shell 24. If desired, the upper plate 110 can be fastened to shell 24 by screws 115 (FIG. 6), screw holes 116 (FIG. 9) being provided in plate 110 for this purpose. Access to the screw heads is had through relatively large apertures 118 formed in plates 110 and 112. The pedestal 13 is fairly heavy so that, when it is secured to the shell 24, it lends a considerable amount of weight to the base 10 as a whole. Consequently, the base has the feel and heft of a solid, sturdy, high quality piece of office furniture.

As best seen in FIG. 9, each plate 110 and 112 is a stamped metal part having a central depression 122 and a peripheral channel 124 both of which rigidify the plate. The plates are placed together back to back so that their depressions and channels are in opposition before being riveted together. A bearing ring 126 made of a slippery plastic material is positioned between the two plates just inboard of channels 124 to facilitate relative motion between the two. The thickness of the ring is less than the spacing between the plates except at a plurality of circular pads 126a distributed around the ring. The ring is secured to one of the plates, say, plate 110, by upstanding fingers 126b located above pads 126a and which project through small openings 128 in plate 110.

The thickness of the ring pads 126a is such that when the plates are riveted together, the central areas of the plates are flexed toward one another so that a certain amount of sliding friction between the plates exists. Accordingly, although the plate 110 can be rotated readily relative to plate 112, it does not spin freely. Finally, three arcuate cushions 132 are adhered to the underside of plate 112 to prevent the base 10 from marring the desk D or other surface on which it rests.

In use, the base 10 is placed on any solid surface such as a desk or base. A video terminal T such as DEC's VT100 terminal is, in turn, positioned on the base with its feet engaged in the receptacles 18 at the top of the base. Desirably, before seating the terminal on the base, a Velcro strip (not shown) which mates with strip 20 is attached to strip 20 and its backing removed. The next time the terminal is removed from the base, that upper Velcro strip remains with the terminal at the correct location thereon for reattachment to strip 20 when the terminal is again placed on the base. Electrical connection between the terminal and the keyboard K through the base can be made by connecting plug 22b to the rear of the terminal and connecting the keyboard cable C to the socket 22b accessible at the front of the base 10. The user can then swivel the terminal via the base until the terminal is oriented at a suitable angle. Then he can slide the base section 14 relative to section 12 forwardly or rearwardly until the terminal screen T' is tilted at an angle which suits him. As noted previously, the pedestal plate 110 does not spin freely and the resilient fingers 64 inhibit relative sliding movement of the two base sections. Therefore, the terminal remains in that chosen position of adjustment until it is readjusted.

It should be noted that the curvature of the mating surfaces of the base sections 12 and 14 is chosen so that the axis of curvature lies appreciably above the top of base 10. This is done not only to give the base a low profile, but also so that the center of gravity of the terminal remains near the center of the base 10 at any selected tilt position of base section 14. In other words, as the base section 14 is moved forwardly as in FIG. 2, its upper wall 72a and therefore the terminal T is tilted upwards by an amount which causes the center of gravity of the terminal to be moved rearwardly as the terminal is shifted forwardly. Likewise, when the section 14 is slid rearwardly as shown in FIG. 3, the center of gravity of the terminal is shifted forwardly to offset that rearward movement so that the weight of the terminal remains concentrated near the center of the base. Consequently, the terminal remains in balance at all tilt angles.

The resilient fingers 64 in conjunction with the corrugation or detent stripes 101 establish the various tilt angles of the base section 14 and terminal T. Therefore, there is minimum tendency for the terminal to seek any particular position such as the neutral or reference position illustrated in FIG. 1 under its own weight. The finger-detent engagements also minimize the likelihood of the terminal being driven beyond the tilt angle selected by the operator due to the inertia of the moving terminal. By the same token, the operator receives a certain amount of feedback from the base when tilting the terminal from one angle to another. Consequently, the operator can accurately estimate the required tilt force that should be applied in a given situation and thereby properly adjust the terminal quite quickly.

If the center of gravity of the terminal T happened to coincide with the center of rotation of base section 14, the amount of holdback force required to accomplish the above objectives would be substantially the same for all tilt angles of the terminal. In reality, however, that is not the case. Therefore, in order for the operator to be able to apply more or less the same force to tilt the terminal a given amount without overrun at all tilt angles, the amount of holdback force provided by the base 10 should vary depending upon the tilt angle of the terminal.

In the present base 10, this is accomplished by varying the profile of the depressions or detents in each detent stripe 101 depending upon the location of the terminal center of gravity. For example, to minimize the tendency of the terminal T specifically illustrated to drive the tilt motion of the base at all tilt angles, the holdback force provided by the base should be greater when the terminal is tilted upwardly as in FIG. 2 than when it is tilted downwardly as in FIG. 3. Therefore, as best seen in FIG. 10, the detents 101a toward the rear (right hand) end of each stripe 101 are deeper or steeper than the detents 101b nearer the forward (left hand) end of the stripe, this difference being shown exaggerated for clarity. The added resistance to motion afforded by finger 64-engagement in the steeper rearward detents 101a offsets the greater inertial driving tendency of the terminal at those upward tilt angles.

Another model terminal having a different weight distribution might require a different stripe 101 design in order for the base to provide the operator with substantially constant tilt position feedback at all tilt angles. Base 10 can be provided with different detent stripe designs to suit different type terminals simply by changing an insert in the mold used to form cover 92 in section 14.

It is also important to note that the base 10 does not interfere with the proper circulation of air through the terminal. When the base section 14 is in its neutral position illustrated in FIG. 1, air is free to flow into the terminal through the ventilation openings or slits 34, 36, 38, 54, and 56 in section 12 and through the openings or slits 94, 96, 98, and 74 in section 14, the various openings in the two base sections being more or less in register.

When the base section 14 is moved forwardly as shown in FIG. 2, the vent slits 56 in section 12 which are in register with slits 38 in that same section assure adequate ventilation at the rear of the terminal. On the other hand, when the base section 14 is moved rearwardly as depicted in FIG. 3, the vent slits 98 at the underside of section 14 are exposed at the rear of the base so that cooling air is free to flow upwardly through section 14 into the vent openings usually present at the underside and rear of the terminal T.

In addition to accommodating the venting requirements of the terminal T which it supports, the present tilt swivel base 10 also takes into account the space needs of the various connectors and plugs at the rear of the terminal. More particularly, when the base section 14 is moved forwardly as illustrated in FIG. 2, connections present at the lower left rear corner of the terminal can swing downwardly by virtue of the relatively large vertical clearance notch 58 in base section 12 which is exposed when section 14 is so shifted.

Various other factors contribute to make base 10 very user oriented. For example, the inclusion of the covers 52 and 92 on the base sections 12 and 14 present finished surfaces at the boundary between those two sections so that there are no potential pinch points which could injure the operator's fingers as he tilts the terminal in one direction or the other. Also as noted previously, the inclusion of the cable 22 in the base eliminates any need to run the keyboard cable C across the desk or other supporting surface from its point of connection at the rear of the terminal. The inclusion of the Velcro strip 20 which registers with a mating Velcro strip at the underside of the terminal removably anchors the terminal to the base so that when an operator lifts the terminal to move it to a different location, the base will not separate from the terminal and fall to the floor.

Still further, as best seen in FIG. 6, provision may be made for screwing a pair of cylindrical rubber feet indicated in dotted lines at 134 in that figure to the bottom rear corners of section 12. In that event, these feet would be positioned to be received in recesses at the rear corners of a spider base made specifically for DEC's VT100 video terminal which base is fitted with casters so there is no need for the base 10 to swivel.

The base 10 is matched to the terminal which it supports in other respects in that it has a very low profile so that it actually appears to be part of the terminal. Also the shell end walls 72d of section 14 are formed with a small draft or overhang of about one-eighth inch to match the draft of the terminal T sidewalls. Yet with all of these advantages, the base is relatively easy and economical to manufacture in quantity and to assemble. Indeed, the assembly of the wheels 106 and of the two sections 12 and 14 can be left to the customer, resulting in a further cost savings to the manufacturer. Accordingly, the base should find wide acceptance in the marketplace.

It will thus be seen that the objects set forth above, among those made apparent from the preceding description, are efficiently attained. Also, since certain changes may be made in the above construction without departing from the scope of the invention. For example, the locations of the fingers 64 and detent stripes 101 and/or of the clip 84 and slots 33 and 62 can be interchanged. Also in some cases, the sections 12 and 14 could be inverted with the terminal resting on section 12 and the pedestal being attached to section 14 to achieve tilt swivel motions of the terminal. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A terminal base of the type having a transverse centerline and comprising
   A. a hollow box-like lower section having a front, a back and a pair of opposite sides;
   B. swivel means mounted to the underside of said lower section permitting said section to swivel relative to a support surface on which they rest;
   C. a hollow box-like upper section
      (1) having a front, a back and a pair of opposite sides;
      (2) positioned on the lower section; and
      (3) having terminal-supporting top surface means;
   D. said upper and lower sections having opposing mating surface portion which are curved from front to back more or less about an imaginary axis which
      (1) is substantially parallel to the transverse center line of said base; and
      (2) lies appreciably above the confines of the base so that, when the upper section is moved on the lower section in either direction about said axis, the upper section is tilted relative to the lower section;
   E. means for limiting the movement of the upper section on the lower section in said directions; and
   F. coacting means on said upper and lower sections defining selected positions of adjustment in the movement of the upper section relative to the lower section.

2. The base defined in claim 1 wherein said terminal supporting top surface means include means for interfitting with depending portions of a terminal supported on the base.

3. The base defined in claim 1 and further including
   A. a plurality of ventilation openings in the lower section;
   B. a plurality of ventilation openings in the upper section, said ventilation openings in both said sections being in communication at all tilt angles of the upper section top surface means to provide proper air circulation into a terminal supported on the base.

4. The base defined in claim 1 wherein the swivel means comprise
   A. a plurality of superimposed rigid dished plates;
   B. means connecting said plates together at their centers so as to flex said plates toward one another thereby inhibiting free relative rotary motion of said plates; and
   C. bearing means positioned between said plates adjacent the peripheries thereof so as to facilitate relative sliding motion of the plates.

5. The base defined in claim 1 wherein
   A. the curvature of said mating curved surface portions enables the upper section top surface means to tilt at least fifteen (15) degrees relative to the lower section; and
   B. the total height of the base is no greater than four (4) inches.

6. The base defined in claim 1 and further including
   A. track-defining means on the curved surface portion of one of said sections extending between the front and the back thereof; and B. wheels carried by the curved surface portion of the other of said sections positioned to engage and move along said track-defining means to facilitate relative movement of said sections.

7. The base defined in claim 6 wherein
   A. each wheel includes a pair of oppositely directed hubs; and
   B. said other section includes
      (1) receptacles in its curved surface portion;
      (2) journal means at the bottom of each receptacle for receiving the hubs of the wheel in that receptacle; and
      (3) a plurality of resilient fingers anchored to said other section opposite said journal means for rotatively capturing the hubs of the wheel against the journal means.

8. The base defined in claim 6 wherein
   A. the track defining means comprise a pair of closely-spaced parallel rails located adjacent each side of said one of said sections; and
   B. at least two wheels are spaced between the front and back of the other of said sections and roll along each rail pair.

9. The base defined in claim 8 wherein each wheel has a peripheral radially outwardly-extending rib which projects into the space between the rail pair on which it rolls to inhibit lateral movement of the wheel.

10. The base defined in claim 1 wherein said limiting means comprise
    A. means defining a slot in one of said sections extending between the front and back thereof, said slot having a selected fixed length; and
    B. a clip projecting from the other of said sections into said slot so that
       (1) said sections are movably connected together; and
       (2) the relative movement of said sections in said directions is limited by the engagement of said clip against the opposite ends of the slot.

11. The base defined in claim 10 wherein either of said clip or said slot is centered further away from the base transverse centerline toward the front or back of said base so that the upper section can be moved relative to the lower section about said axis further in one direction than in the opposite direction.

12. The base defined in claim 1 wherein the coacting means comprise
    A. a lengthwise series of detents extending between the front and back of the curved surface portion of one of said sections; and
    B. a resilient projection on the curved surface portion of the other of said sections positioned to resiliently engage the detents in said series when said upper section is moved in said directions relative to the lower section to releasably restrain such movement.

13. The base defined in claim 12 wherein a plurality of coacting detent series and projections are present between the sides of said sections.

14. The base defined in claim 12 wherein the coaction between the projection and the detents of said series varies along the length of the series so that the holdback force provided by the coacting means varies with the tilt angle of the upper section.

15. The base defined in claim 14 wherein the detent series profile varies along its length to provide the force variation.

16. The base defined in claim 1 and further including
    A. an electrical cable extending between the front and back of said lower section;
    B. an electrical connector on one end of the cable mounted at or near the rear of the lower section;
    C. a second electrical connector on the other end of the cable mounted at or near the front of the lower section and being accessible from without that section; and
    D. means on the lower section interfitting with said cable to inhibit lengthwise motion thereof relative to said lower section.

17. A terminal base of the type having a transverse centerline and comprising
    A. a lower section, said lower section including a top wall curved about an imaginary axis which extends parallel to the transverse centerline of the base and lies an appreciable distance above the base;
    B. an upper section, said upper section
       (1) including a bottom wall having the same curvature as said lower section top wall, and
       (2) being positioned on the lower section with said curved walls in opposition;
    C. track-defining means extending along one of said curved walls substantially perpendicular to said centerline;
    D. a plurality of wheels rotatively supported at the other curved wall in engagement with said track-defining means so that the upper section is constrained to roll relative to said lower section about said axis whereby the upper section tilts relative to the lower section;
    E. means for limiting the rolling excursions of the upper section; and
    F. means for restraining rolling movements of the upper section at selected positions along said track-defining means so as to releasably set the upper section at selected tilt angles.

18. The base defined in claim 17 wherein the lower section also includes swivel means affixed to its underside which enables the lower section to swivel relative to a supporting surface on which it is placed about a substantially vertical axis.

19. The base defined in claim 17 wherein the two sections comprise hollow plastic shells.

20. A terminal base as defined in claim 17 wherein
    A. the track-defining means include at least one wheel-engaged rail positioned adjacent each side of the base; and
    B. each wheel includes a peripheral radially outwardly extending flange which engages the sides of the rails on which it rolls.

21. A terminal base as defined in claim 20 wherein
    A. each wheel has a pair of rail-engaging surfaces on each side of its flange which are oppositely inclined; and
    B. the track-defining means include a pair of closely-spaced rails engaged by each wheel and whose surfaces are inclined to mate with the engaging wheel surfaces.

22. The base defined in claim 17 wherein the restraining means comprise
    A. at least one series of detents formed in one of said curved walls and extending substantially parallel to said track-defining means; and
    B. at least one projection extending from the other of said curved walls in position to resiliently engage the detents of said series as the upper section is moved relative to the lower section.

23. The base defined in claim 22 wherein the profile of the detents varies along each said series so as to vary the movement-restraining force imposed on the upper section due to engagement of the detents by the associated projection in accordance with the tilt angle of the upper section.

* * * * *